United States Patent

Bradley

[15] 3,700,193
[45] Oct. 24, 1972

[54] A METHOD OF DELIVERING A VEHICLE TO EARTH ORBIT AND RETURNING THE REUSABLE PORTION THEREOF TO EARTH

[72] Inventor: Raymond H. Bradley, Houston, Tex.

[73] Assignee: The United States of America as represented by the Administrator of the National Aeronautics and Space Administration

[22] Filed: Jan. 14, 1971

[21] Appl. No.: 106,465

[52] U.S. Cl. ............................................. 244/155
[51] Int. Cl. .............................................. B64g 1/00
[58] Field of Search ....................... 244/155, 15 D

[56] References Cited

UNITED STATES PATENTS

| | | | |
|---|---|---|---|
| 3,576,298 | 4/1971 | Barnett | 244/155 |
| 3,369,771 | 2/1968 | Walley et al. | 244/155 |
| 3,534,924 | 10/1970 | Spencer et al. | 244/15 D |

Primary Examiner—Evon C. Blunk
Assistant Examiner—Douglas D. Watts
Attorney—Edward K. Fein, Marvin F. Matthews and John R. Manning

[57] ABSTRACT

The present invention relates to a space shuttle system for delivering payload to earth orbit or other celestial orbit comprising a specially designed stage to be used with the orbiter and booster of the space shuttle. The booster can carry either the orbiter or the stage to a sub-orbital staging point. Both the orbiter and the stage are capable of proceeding from such a staging point to celestial orbit carrying a payload. The orbiter, having re-entry equipment, is capable of re-entering the earth's atmosphere and landing on earth. The orbiter has a re-entry environment protected bay in which its payload can be carried. The stage, being independent of re-entry equipment, has a large payload carrying compartment and a smaller, detachable subsystem carrying portion which can be received into and carried back to earth in the protected payload bay of the orbiter.

1 Claim, 4 Drawing Figures

PATENTED OCT 24 1972 3,700,193

RAYMOND H. BRADLEY
INVENTOR.

BY
W. R. Marcontell
ATTORNEY

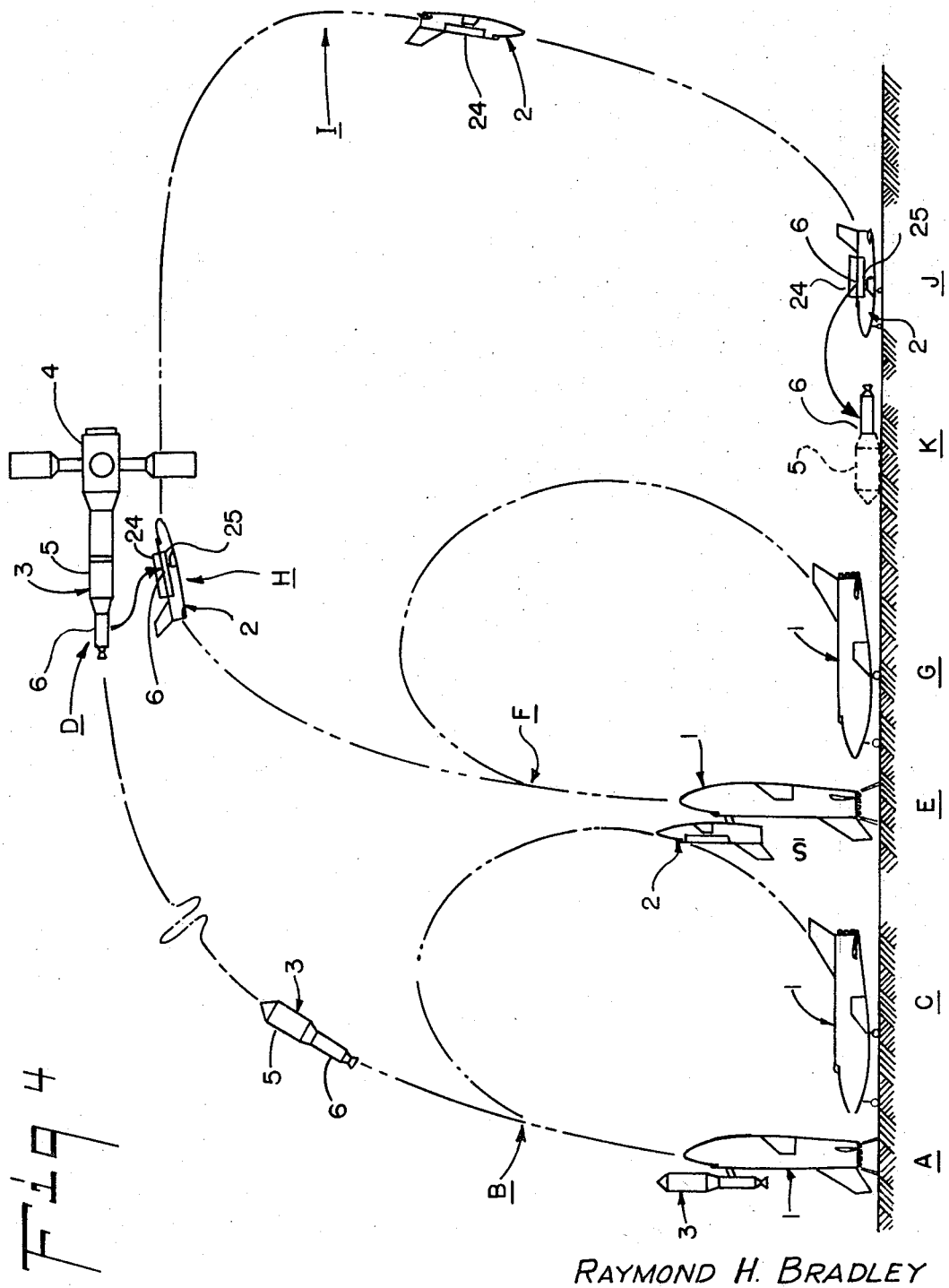

METHOD OF DELIVERING A VEHICLE TO EARTH ORBIT AND RETURNING THE REUSABLE PORTION THEREOF TO EARTH

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

The concept of a space shuttle system is well known in the art of space technology. A shuttle is a two vehicle system consisting of a booster and an orbiter. The booster carries the orbiter from launch to a sub orbital staging point. The orbiter can then deliver a payload to earth orbit. Preferably both the booster and the orbiter have aerodynamic lifting and control surfaces and can be landed on earth and reused. The payload which such a system can deliver to earth orbit is necessarily limited in bulk and weight since it is carried in a payload bay in the orbiter.

The present invention relates to a specially designed unmanned stage for the shuttle. The stage could be attached to and carried by the shuttle booster in place of the orbiter and would be designed to give approximately the same flight characteristics to the system as would the orbiter. It is noted that, while reference is made in this description to "earth orbit," the shuttle system and special stage could be used in missions to other celestial orbits.

The special stage comprises two distinct parts. The two parts are detachable, the upper part being expendable, and the lower part being reusable. The lower part is the smaller of the two and carries all the working subsystems of the stage as well as most of the propellants. The relatively large upper part is designed to carry a payload and possibly part of the propellants. The reusable lower part, after being detached from the upper part, can be received into the payload bay of the shuttle orbiter. Thus an orbiter, which had delivered its own payload to earth orbit in another mission, can return the reusable part to earth. The special stage need not have re-entry environment protection means or aerodynamic lifting and control surfaces of its own since it is carried in the bay of the orbiter on its return to earth. The reusable part, in which the costly subsystems are located, can then be made small and lightweight as compared to the stage as a whole. Therefore, a much larger and heavier payload than that carried by an orbiter can be carried by the stage. It could conceivably be from 1.5 to 6 times as heavy. The expendable part could, in addition to carrying payload, be a payload itself, e.g., a part for a space station which is too large to be carried in the bay of the orbiter. One launch of such a special stage followed by one launch of an orbiter will deliver two payloads to earth orbit. Yet only one return trip is required to retrieve both the orbiter and the reusable part of the stages. Also since the reusable part of the stage is completely protected from the re-entry environment, it can be serviced and reused more times than a shuttle orbiter. For these reasons, use of such a special stage for the space shuttle would greatly reduce the cost of transporting payload to earth orbit.

The special stage or the reusable part thereof could also be adapted for refueling in earth orbit, and its subsystems could be automatic and re-programmable. The stage, or its reusable part, after being refueled and re-programmed in space, could be employed for other types of missions before being returned to earth. For instance, it could be used for orbit-to-orbit missions or for missions requiring execution of a plane change in earth orbit.

SUMMARY OF THE INVENTION

It is therefore an object of the present invention to provide a special stage for the space shuttle in which all the working subsystems are concentrated in a reusable portion.

It is a further object of the invention to provide a stage for the space shuttle in which a reusable portion is adapted to be carried in the payload bay of the shuttle orbiter.

It is another object of the invention to provide a stage for the space shuttle with an expendable portion capable of carrying larger and heavier payloads than those carried by the shuttle orbiter.

It is another object of the invention to provide a stage for the space shuttle which is capable of orbit-to-orbit flight and is capable of performing a plane change in earth orbit.

These and other features of the invention will be made apparent by the following description which refers to the drawings.

BRIEF DESCRIPTION OF THE DRAWINGS

FIG. 4 is a diagrammatic representation of a typical mission involving the special stage.

DESCRIPTION OF THE PREFERRED EMBODIMENTS

Figure 2:
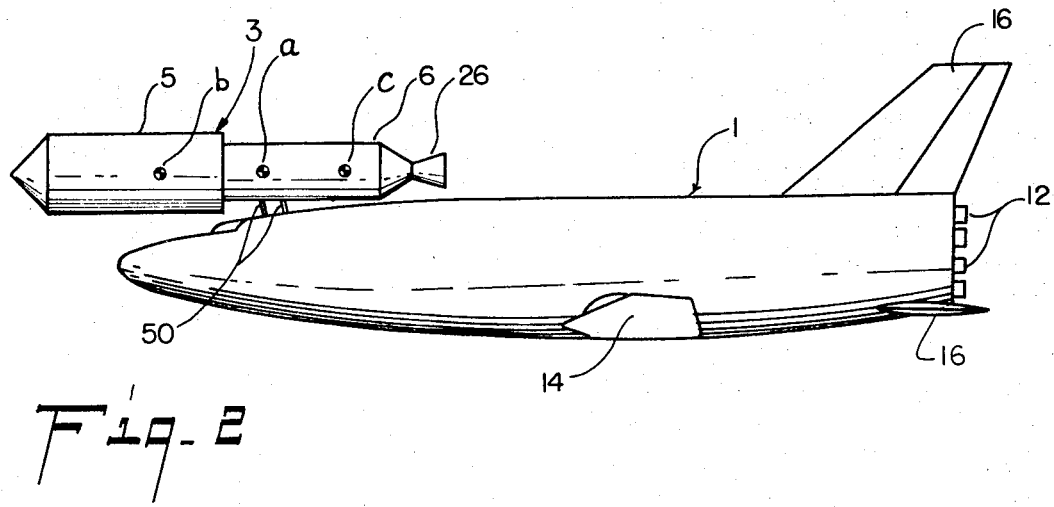
FIG. 2 is a side elevational view of the shuttle booster with the specially designed stage mounted thereon.
Figure 3:
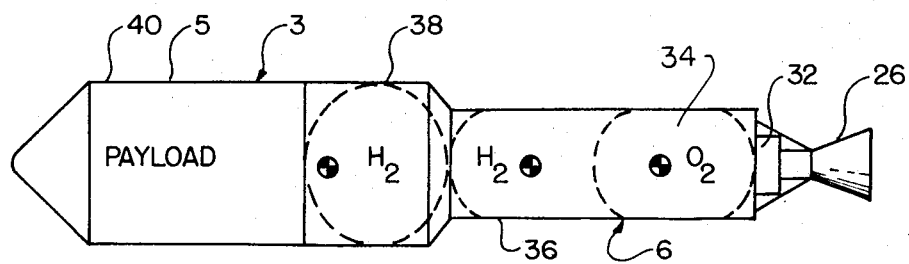
FIG. 3 is a diagrammatic elevation of the stage.
Figure 1:
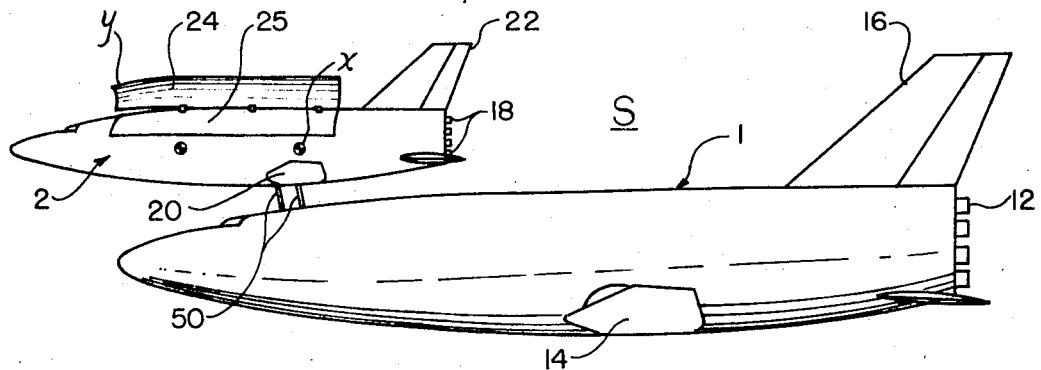
FIG. 1 is a side elevational view of the space shuttle with the orbiter mounted on the booster, and showing one possible arrangement of the payload bay.

The space shuttle S comprises two vehicles, a booster 1 and an orbiter 2. The booster 1 is preferably a manned vehicle powered by rocket engines 12 and having aerodynamic lifting surfaces 14 and aerodynamic control surface 16. The orbiter 2 is a smaller, likewise preferably manned, vehicle powered by rocket engines 18 and having aerodynamic lifting surfaces 20 and aerodynamic control surface 22. There may be other control and lifting surfaces additional to or in lieu of those shown. The orbiter 2 also has a re-entry environment protected payload bay 25 suitably covered as by a door 24.

At launch as heretofore proposed, the orbiter 2 is attached to the booster 1 by suitable attachment means 50. The engines 12 of the booster 1 are fired, and the booster 1 carries the orbiter 2 to a suitable staging point. At this point the two vehicles separate, the engines 18 of the orbiter 2 are fired, and the orbiter 2 proceeds under its own power to earth orbit. The booster 1 returns from the staging point to earth and lands. When the orbiter 2 arrives at earth orbit, it discharges its payload from and/or receives a new payload into the payload bay 24 and returns to earth and lands. Both the booster 1 and the orbiter 2 are capable of controlled flight and landing similar to that of jet aircraft by virtue of their lifting surfaces 14, 20 and control surfaces 16, 22.

In accord with the present invention an unmanned stage 3 is attached to the booster 1 by suitable attachment means 50 (See FIG. 2). The stage 3 is a vehicle which is designed to give approximately the same flight characteristics to the system as does the orbiter 2, (e.g., the launch center of gravity $a$ and the burnout center of gravity $b$ of the stage 3 are in positions comparable to (the same as) the launch center of gravity $x$ and the burnout center of gravity $y$ of the orbiter respectively.) This specialized design enables on booster 1 (or type of booster) to carry either the orbiter 2 or the stage 3.

The stage 3 comprises two detachable parts: an upper part 5 and a lower part 6. The upper part 5 is expendable while the lower part 6 is reusable.

The lower part 6 is smaller than the upper part 5 and contains a rocket engine 26, all the working subsystems 32 of the stage 3, and tanks 34 and 36 which carry the greatest mass of the propellants such as oxygen, which also requires the most costly containers. The subsystems 32 are the most costly parts of the entire stage 3, representing about 90 percent of the total cost. They comprise, for example: guidance means, electrical power means, hydraulic power means, a computer system, and other parts. This lower part is designed to be contained and carried within the payload bay 25 of the orbiter 2.

The upper part 5 contains a propellant tank 38 and a large payload-carrying compartment 40. In some cases the upper part 5 might itself constitute a payload, in addition to carrying other payload and propellant. For instance the upper part 5 of the stage 3 could be a part for a space station 4 (See FIG. 4) which is too large to be carried in the largest feasible payload bay 25 of the orbiter 2.

Referring now to FIG. 4, a typical mission would begin with launch A of a booster 1 carrying specially designed stage 3. At an appropriate distance from earth, the two vehicles (booster 1 and stage 3) would disengage from one another at staging point B. The booster 1 would return to earth and land at C while the stage 3 would continue to earth orbit and dock D at a space station 4.

In the mission shown, the upper part 5 of the stage 3 is a part for the space station 4. The upper part 5 of the stage 3 also serves as a compartment for carrying payload and propellant. After docking D of the stage 3 with the space station 4, the lower part 6 of the stage 3 is detached from the upper part 5.

In a second launch E, shuttle orbiter 2 carrying payload and/or personnel would be carried by the same or a different booster 1 to a suitable staging point F. Again the booster 1 would return to earth and land G. The orbiter 2 would proceed to the space station 4, unload its payload, and receive the reusable part 6 of the stage 3 into its payload bay 25, H. The orbiter 2 then returns I to earth and lands J. The part 6 is then removed K from the payload bay 25 of the orbiter 2 and serviced in preparation for another mission. When it receives a new upper part 5, it is ready for another launch.

In this type of mission two payloads are delivered to earth orbit, but only one orbiter return trip is required. In the one return trip both the orbiter and the reusable part 6 of the special stage 3 (both of which delivered a full payload to earth orbit) are retrieved for further use.

Because the special stage 3 is carried back to earth in the re-entry environment protected bay of the orbiter, it does not require lifting and control surfaces and a heat shield. The weight eliminated by the absence of these structures allows the stage 3 to carry a much heavier payload than that of the orbiter 2. The weight of the stage's payload could conceivably be from 1.5 to 6 times that weight of the orbiter's payload. The fact that the stage's costly subsystems are concentrated in the small lower part also allows it to carry a bulkier payload than does the orbiter. Furthermore, the environment protection which the reusable part receives by being carried in the bay 25 makes it possible to service and reuse one such part even more times than an orbiter could be used.

It should also be noted that the special stage 3, or the reusable part thereof 6, once it has reached earth orbit, can be refueled, re-programmed, and used for further missions such as orbit-to-orbit flights or flights about the earth involving a plane change. As noted above, the celestial orbit involved in the mission need not be an earth orbit.

What is claimed is:

1. A method of delivering a vehicle consisting of a payload-carrying portion and a reusable subsystem-carrying portion to earth orbit and returning the reusable portion thereof to earth, comprising:
   launching a vehicle to a suborbital staging point by means of a space shuttle booster;
   separating said vehicle from said space shuttle booster at said suborbital staging point;
   causing said vehicle to travel, under its own propulsion and guiding means, from said suborbital staging point to earth orbit;
   separating said payload-carrying portion and said subsystem-carrying portion of said vehicle while in earth orbit;
   inserting said subsystem-carrying portion into a payload bay in a space shuttle orbiter; and
   returning said subsystem-carrying portion to earth in said space shuttle orbiter.

* * * * *